Jan. 15, 1929. Re. 17,196

C. E. SHIELDS

TOASTER

Original Filed May 2, 1923

Witness:
Chas. R. Kourek.

Inventor:
Carl E. Shields,
Offices, Mehlhope Scott & Wood, Attys

Reissued Jan. 15, 1929. Re. 17,196

UNITED STATES PATENT OFFICE.

CARL E. SHIELDS, OF CHICAGO, ILLINOIS, ASSIGNOR TO ROCK ISLAND MANUFACTURING COMPANY, OF ROCK ISLAND, ILLINOIS, A CORPORATION OF ILLINOIS.

TOASTER.

Original No. 1,624,017, dated April 12, 1927, Serial No. 636,061, filed May 2, 1923. Application for reissue filed November 30, 1928. Serial No. 322,934.

My invention relates more particularly to toasters in which the heat is generated by an electric current, although the heat, however, may be generated by any other desired means.

The object of my invention is to provide an electric toaster capable of automatically reversing that which is to be toasted when toasted on one side, so as to present the untoasted side to the heat-producing element without manual intervention.

Another object of my invention is to provide means by which to present the heat uniformly to the entire surface of that which is to be toasted.

The accompanying drawings illustrate my improved toaster, in which

Figure 1:
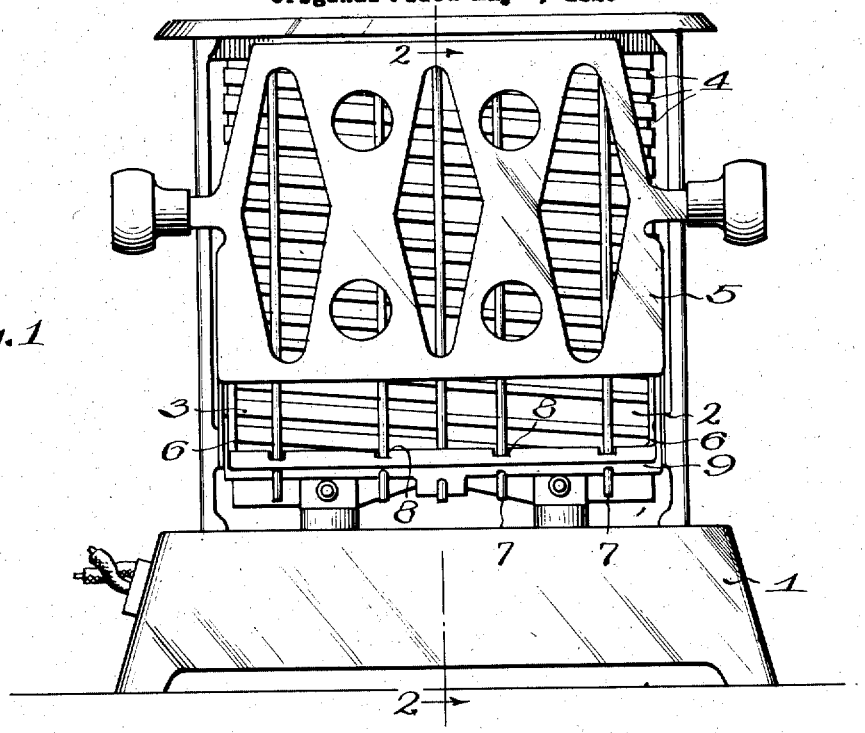
Figure 1 is a front view of the toaster with the carrier elevated into the toasting position.
Figure 2:
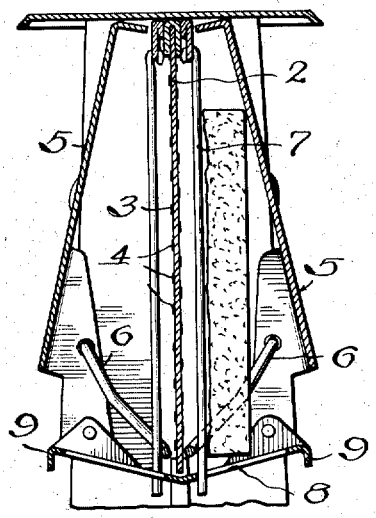
Figure 2 is a sectional view of the toaster on line 2—2 of Figure 1.

The mechanism of the toaster is mounted upon a base 1 and the heat-producing element 2 is secured to the base and projects upwardly therefrom. This heat-producing element is of ordinary construction consisting of the isinglass 3 and conductors 4, 4 extending along the face of the isinglass. The conductors 4, 4 of the heat-producing element are connected in circuit in the usual way. The same construction is duplicated on opposite sides of the heating element, but for the purpose of the following description but one side will be considered.

A carrier 5 is hinged to swing toward and away from the heat-producing element 2 in the usual manner. This carrier 5 has rigidly secured to it a pulling bail 6 which extends angularly and rearwardly from the carrier, and then transversely across the interior of the toaster in front of the heat-producing element 2, and in the rear of pendant bars 7, pivotally secured to the top plate of the toaster, the lower end portions of which move within transverse guiding slots 8 formed in a supporting plate 9 rigidly secured to the sides of the toaster, said plate being inclined downwardly toward the lower edge of the heating element at a slight angle to the horizontal.

It will be observed, that when that which is to be toasted is positioned upon the rigid supporting plate 9 and the pivoted carrier 5 is in closed position, the pandant rods 7 are in a vertical position, and parallel to the face of the heat-producing element 2, so that that which is to be toasted is likewise held parallel with the face of the heat-producing element. This arrangement brings about a uniformity of toasting over the entire surface of that which is to be toasted, and obviates the necessity of winding the heat-producing element so as to produce more heat at one point of the heat-producing element than at other points to obtain uniform toasting. It is obvious that the supporting plate 9 supports the toast on its bottom edge and against the pivoted pendant bars 7.

Figure 3:
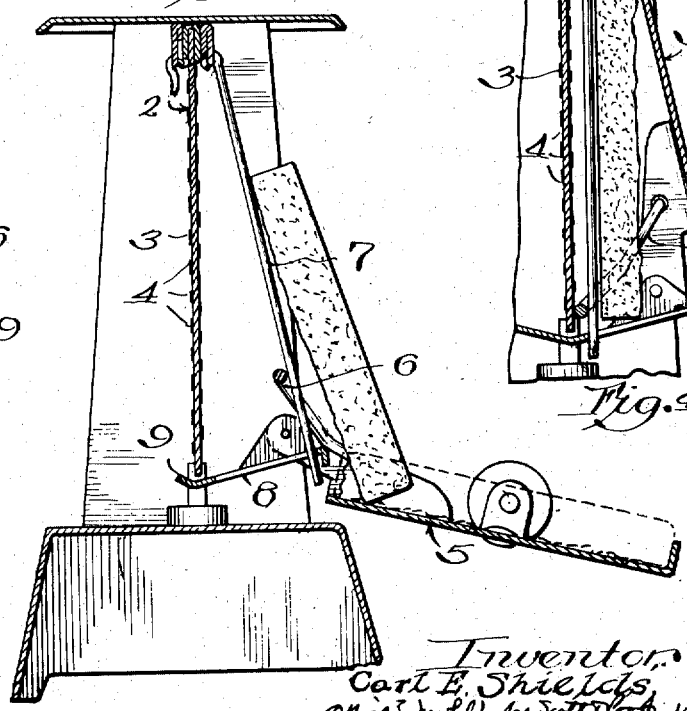
Figure 3 is a sectional view, similar to Figure 2, showing that which is to be toasted in the act of reversing.
Figure 4:
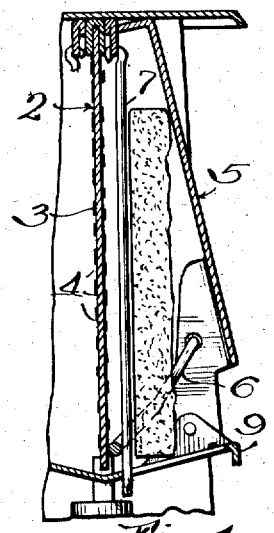
Figure 4 is a sectional view, similar to Figure 2, showing that which is to be toasted in the reversed position.

It is also manifest that when the hinged carrier 5 is being lowered into open position the bail 6 pulls the free ends of the reversing bars forward within their guiding slots 8, which in turn act to slide the bottom portion of that which is to be toasted forward and away from the heat-producing element with a slight upward movement due to the inclination of said plate. Thus as the carrier is lowered, the toast is projected or "kicked" from the stationary plate 9 and upon striking the downwardly inclined carrier, slides down upon the carrier with the untoasted side uppermost, as indicated by the dotted lines in Fig. 3. The pulling bail acting on the pivoted reversing bars pulls the bottom of that which is to be toasted forward and away from the heat-producing element, and then since the arms of the pulling bail are bent, these arms engage the edge of the supporting plate 9 thus providing fulcrums upon which the arms turn in the further movement of the carrier, imparting to the pivoted reversing bars a quick accelerated movement as the toast leaves the supporting plate to insure a movement of that which is to be toasted which will invariably bring about a complete reversal.

It is also apparent that the pendant pivoted reversing bars perform a double function, for they not only serve to hold that which is to be toasted parallel in relation to the vertical heat-producing element but they also serve by their forward movement in the slots to automatically bring about the reversal.

It will also be manifest that the reversal is brought about without the necessity of positioning that which is to be toasted angularly relative to the heat-producing element.

What I claim as my invention is:

1. A toaster comprising a heating element, a fixed supporting member adjacent the base of said heating element, a movable supporting member normally positioned in substantially parallel relation with said heating element and engaging said fixed supporting member for limited movement toward and from said heating element, a carrier movable to and from said heating element, and means operatively connecting said carrier and movable supporting member whereby the latter is actuated transversely of said fixed supporting member.

2. A toaster comprising a heating element, a fixed supporting member adjacent the base of said heating element, a movable supporting member normally positioned parallel with said heating element and engaging said fixed supporting member for predetermined movement transversely thereof from its normal parallel position, a carrier movable to and from said heating element, and means operatively connecting said carrier and movable supporting member whereby the latter is displaced from its normal position in the movement of the carrier from the heating element.

3. A toaster comprising an upright heating element, a fixed supporting member adjacent the base of said heating element, a grill depending from a point adjacent the upper end of said heating element and having a lower end portion engaging a slot extending transversely of said supporting plate and terminating adjacent the outer edge thereof, and a carrier hinged adjacent the fixed supporting member and operatively connected with the lower portion of said grill whereby the latter is actuated in the movement of said carrier.

4. A toaster comprising an upright heating element, a transverse supporting member adjacent the base of said heating element, a grill comprising a plurality of spaced bars pivotally suspended at their upper ends to normally depend in a plane substantially parallel with said heating element and having their lower ends engaging slots extending transversely of said supporting member, a carrier hinged to swing toward and from said heating element, and a bail connected at its ends to said carrier and embracing the lower end portion of said bars.

5. A toaster comprising an upright heating element, a transverse supporting member adjacent the base of said heating element, a grill comprising a plurality of parallel bars pivotally suspended in a plane substantially parallel to said heating element, a fixed plate adjacent the base of said heating element and provided with transverse slots extending to the outer endge of said plate engaged by the lower ends of said bars, a carrier hinged to move toward and from said heating element and a bail connected with said carrier and embracing the lower end portions of said bars.

Signed by me at Chicago, Illinois, this 2 day of November 1928.

CARL E. SHIELDS.